United States Patent
Na et al.

(10) Patent No.: US 12,172,624 B2
(45) Date of Patent: Dec. 24, 2024

(54) HYBRID ELECTRIC VEHICLE AND METHOD OF CONTROLLING DRIVING THEREOF

(71) Applicants: Hyundai Motor Company, Seoul (KR); Kia Corporation, Seoul (KR)

(72) Inventors: Sung Chan Na, Seoul (KR); Seong Ik Park, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 335 days.

(21) Appl. No.: 17/550,326

(22) Filed: Dec. 14, 2021

(65) Prior Publication Data

US 2022/0203956 A1 Jun. 30, 2022

(30) Foreign Application Priority Data

Dec. 30, 2020 (KR) .................. 10-2020-0187399

(51) Int. Cl.
*B60W 20/10* (2016.01)
*B60K 6/52* (2007.10)
(Continued)

(52) U.S. Cl.
CPC ............... *B60W 20/10* (2013.01); *B60K 6/52* (2013.01); *B60K 17/356* (2013.01); *B60W 50/10* (2013.01);
(Continued)

(58) Field of Classification Search
CPC ...... B60W 10/14; B60W 10/02; B60W 10/11; B60W 10/10; B60W 10/08; B60W 10/06; B60W 10/119; B60W 20/10; B60W 20/00; B60W 20/30; B60W 20/40; B60W 20/20; B60W 40/064; B60W 40/06;
(Continued)

(56) References Cited

U.S. PATENT DOCUMENTS 4,699,236 A * 10/1987 Morisawa .......... B60K 23/0808
701/69
2002/0107617 A1* 8/2002 Tomikawa .......... B60K 23/0808
903/917

(Continued)

FOREIGN PATENT DOCUMENTS

JP 4625632 B2 2/2011

*Primary Examiner* — Russell Frejd
*Assistant Examiner* — Brandon Z Willis
(74) *Attorney, Agent, or Firm* — SLATER MATSIL, LLP

(57) ABSTRACT

A method of controlling driving of a hybrid electric vehicle having an engine connected to main drive wheels via a transmission and a motor connected to auxiliary drive wheels includes setting a drive mode, controlling an input torque of the transmission in response to an extent of depression of an accelerator pedal (APS) according to the drive mode, performing distribution of drive power to the main drive wheels and the auxiliary drive wheels and variable shift-pattern control based on a result of a comparison between an amount of slip of the main drive wheels and the amount of slip of the auxiliary drive wheels, and determining whether to perform variable shift-time control in consideration of a type of the variable shift-pattern control or a number of revolutions per minute (RPM) of the engine at beginning of a shift.

19 Claims, 9 Drawing Sheets

(51) Int. Cl.
*B60K 17/356* (2006.01)
*B60W 50/10* (2012.01)

(52) U.S. Cl.
CPC . *B60W 2510/0638* (2013.01); *B60W 2520/26* (2013.01); *B60W 2520/40* (2013.01); *B60W 2530/16* (2013.01); *B60W 2540/10* (2013.01); *B60W 2552/05* (2020.02); *B60W 2552/40* (2020.02); *B60W 2555/20* (2020.02); *B60W 2710/10* (2013.01); *B60W 2720/40* (2013.01)

(58) Field of Classification Search
CPC ....... B60W 40/068; B60W 2510/0638; B60W 2510/0657; B60W 2520/10; B60W 2520/26; B60W 2520/263; B60W 2520/40; B60W 2520/403; B60W 2050/0002; B60W 2530/16; B60W 2552/05; B60W 2552/40; B60W 2540/10; B60W 2555/20; B60W 2710/10; B60W 2710/0666; B60W 2710/0677; B60W 2710/083; B60W 2710/086; B60W 2710/1005; B60W 2710/1022; B60W 2710/1033; B60W 2710/105; B60W 2710/1061; B60W 2720/40; B60W 2720/403; B60K 6/52; B60K 6/387; B60K 6/485; B60K 6/42; B60K 7/0007; B60K 17/34; B60K 17/348; B60K 17/354; B60K 17/356; B60K 2023/085; B60K 2023/0825; B60K 2023/0833; B60K 2023/0816; B60K 23/08; B60K 23/0808; B60Y 2200/92; Y02T 10/62; F16H 59/18; F16H 59/50; F16H 2059/506; F16H 61/0006; F16H 2061/0075; Y04S 10/126

See application file for complete search history.

(56) References Cited

U.S. PATENT DOCUMENTS

| | | |
|---|---|---|
| 2005/0150702 A1 | 7/2005 | Matsuzaki |
| 2006/0276289 A1* | 12/2006 | Hirata ................... B60W 10/02 475/5 |
| 2017/0246957 A1* | 8/2017 | Ienaga ................. B60K 17/356 |
| 2020/0009962 A1* | 1/2020 | Tanaka ............ B60W 30/18018 |
| 2021/0253088 A1* | 8/2021 | Oguro ................. B60W 40/068 |
| 2021/0276555 A1* | 9/2021 | Ren ....................... B60W 50/08 |

* cited by examiner

HYBRID ELECTRIC VEHICLE AND METHOD OF CONTROLLING DRIVING THEREOF

CROSS-REFERENCE TO RELATED APPLICATIONS

This application claims the benefit of Korean Patent Application No. 10-2020-0187399, filed on Dec. 30, 2020, which application is hereby incorporated herein by reference.

TECHNICAL FIELD

The present invention relates to a hybrid electric vehicle and to a method of controlling driving thereof.

BACKGROUND

A general vehicle employs a two-wheel-drive system, in which power of a power source is transmitted to two drive wheels, i.e. two front wheels or two rear wheels, depending on the type of powertrain system. Different therefrom, an all-wheel-drive (AWD) vehicle is a vehicle in which power of a power source is transmitted to all four wheels, either constantly or when necessary.

An all-wheel-drive vehicle is advantageous in that drive power is more stably transmitted to the ground than in the case of a two-wheel-drive vehicle when the road conditions are bad or when the vehicle turns a corner.

In general, an all-wheel-drive vehicle distributes total drive power to front wheels and rear wheels according to a predetermined power split ratio via mechanical connection of a transfer case, which is disposed at the end of a powertrain system (e.g. an output of a transmission). Such a drive power distribution system may be referred to as a "mechanical all-wheel-drive system".

However, the mechanical all-wheel-drive system has a shortcoming in that power loss occurs due to the transfer case. Also, since it is impossible to completely independently control the front wheels and the rear wheels, drive power is uniformly distributed to the front wheels and the rear wheels according to the drive mode selected by a driver. Therefore, the mechanical all-wheel-drive system fails to effectively respond to changes in the amount of tire slip attributable to changes in road conditions.

SUMMARY

The present invention relates to a hybrid electric vehicle and to a method of controlling driving thereof. Particular embodiments relate to an all-wheel-drive hybrid electric vehicle configured such that an engine is connected to main drive wheels and a motor is connected to auxiliary drive wheels and to a method of controlling driving thereof on a rough road.

Accordingly, embodiments of the present invention provide a hybrid electric vehicle and a method of controlling driving thereof that can substantially obviate one or more problems due to limitations and disadvantages of the related art.

An embodiment of the present invention provides an all-wheel-drive hybrid electric vehicle and a method of controlling driving thereof capable of more effectively responding to changes in road conditions.

In particular, an embodiment of the present invention provides an all-wheel-drive hybrid electric vehicle and a method of controlling driving thereof capable of independently controlling front wheels and rear wheels, thereby enabling effective ability to cope with a rough road.

However, embodiments of the present invention are not limited to the above-mentioned embodiments, and other embodiments not mentioned herein will be clearly understood by those skilled in the art from the following description.

According to an embodiment of the present invention, a method of controlling driving of a hybrid electric vehicle in which an engine is connected to main drive wheels via a transmission and a motor is connected to auxiliary drive wheels may include setting a drive mode, controlling input torque of the transmission in response to an extent of depression of an accelerator pedal (APS) according to the drive mode, performing distribution of drive power to the main drive wheels and the auxiliary drive wheels and variable shift-pattern control based on the result of comparison between the amount of slip of the main drive wheels and the amount of slip of the auxiliary drive wheels, and determining whether to perform variable shift-time control in consideration of at least one of the type of variable shift-pattern control or the number of revolutions per minute (RPM) of the engine at the beginning of shift.

In addition, a hybrid electric vehicle according to an embodiment of the present invention may include an engine connected to main drive wheels via a transmission, a motor connected to auxiliary drive wheels, a first control unit configured to perform distribution of drive power to the main drive wheels and the auxiliary drive wheels according to a drive mode, and a second control unit configured to control the transmission. The first control unit may include a drive power distributor configured to control input torque of the transmission in response to an extent of depression of an accelerator pedal (APS) according to the drive mode and to perform distribution of drive power to the main drive wheels and the auxiliary drive wheels based on the result of comparison between the amount of slip of the main drive wheels and the amount of slip of the auxiliary drive wheels. The second control unit may include a shift pattern controller, configured to perform variable shift-pattern control in response to distribution of the drive power by the drive power distributor, and a shift time controller, configured to determine whether to perform variable shift-time control in consideration of at least one of the type of variable shift-pattern control or the number of revolutions per minute (RPM) of the engine at the beginning of shift.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of embodiments of the invention. In the drawings.

DETAILED DESCRIPTION OF ILLUSTRATIVE EMBODIMENTS

Figure 1:
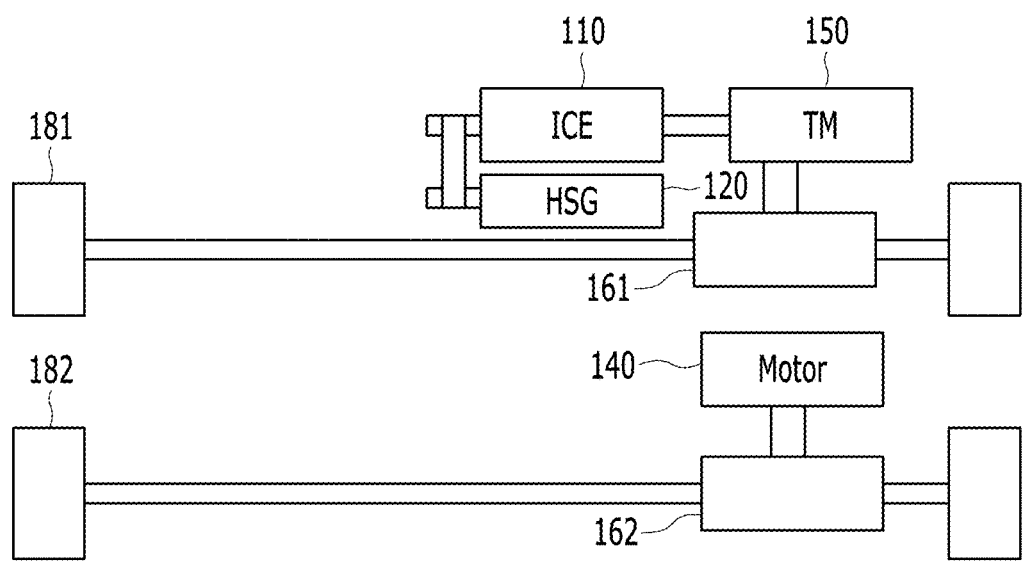
FIG. 1 shows an example of the structure of a hybrid electric vehicle employing an electric all-wheel-drive system to which embodiments of the present invention are applicable.

Hereinafter, embodiments of the present invention will be described in detail with reference to the accompanying drawings so that those skilled in the art may easily carry out the embodiments. The present invention may, however, be embodied in many different forms, and should not be construed as being limited to the embodiments set forth herein. In the drawings, parts irrelevant to the description of the present invention will be omitted for clarity. Like reference numerals refer to like elements throughout the specification.

Throughout the specification, when a certain part "includes" or "comprises" a certain component, this indicates that other components are not excluded, and may be further included unless otherwise noted. The same reference numerals used throughout the specification refer to the same constituent elements.

Prior to describing a method of controlling driving of an all-wheel-drive hybrid electric vehicle according to embodiments of the present invention, the structure and the control system of an all-wheel-drive hybrid electric vehicle to which embodiments of the present invention are applicable will be described with reference to FIGS. 1 and 2.

FIG. 1 shows an example of the structure of a hybrid electric vehicle employing an electric all-wheel-drive system.

Referring to FIG. 1, in general, in a vehicle equipped with an electric all-wheel-drive system, the front wheels 181 serve as main drive wheels, and the rear wheels 182 serve as auxiliary drive wheels. Such a vehicle is driven in an all-wheel-drive mode using both drive power from an engine (ICE) 110 connected to the front wheels 181 and drive power from a motor 140 connected to the rear wheels 182 by operating the engine 110 and the motor 140.

The engine 110 may be cranked via a hybrid starter generator (HSG) 120, and the HSG 120 may operate as a generator when the engine 110 is turned off to thereby recover rotational energy of the engine 110. The power of the engine 110 may be transmitted to the wheels via a transmission (TM) 150 and a differential gear 161. Depending on the configuration, the HSG 120 may be substituted with a starter motor (not shown).

The power of the motor 140 connected to the rear wheels 182 may be transmitted to the rear wheels 182 via a final drive (FD) 162.

In the following description, the electric all-wheel-drive hybrid electric vehicle will be referred to as a "hybrid electric vehicle" for convenience of description unless otherwise stated. The control system of the hybrid electric vehicle will be described with reference to FIG. 2.

Figure 2:
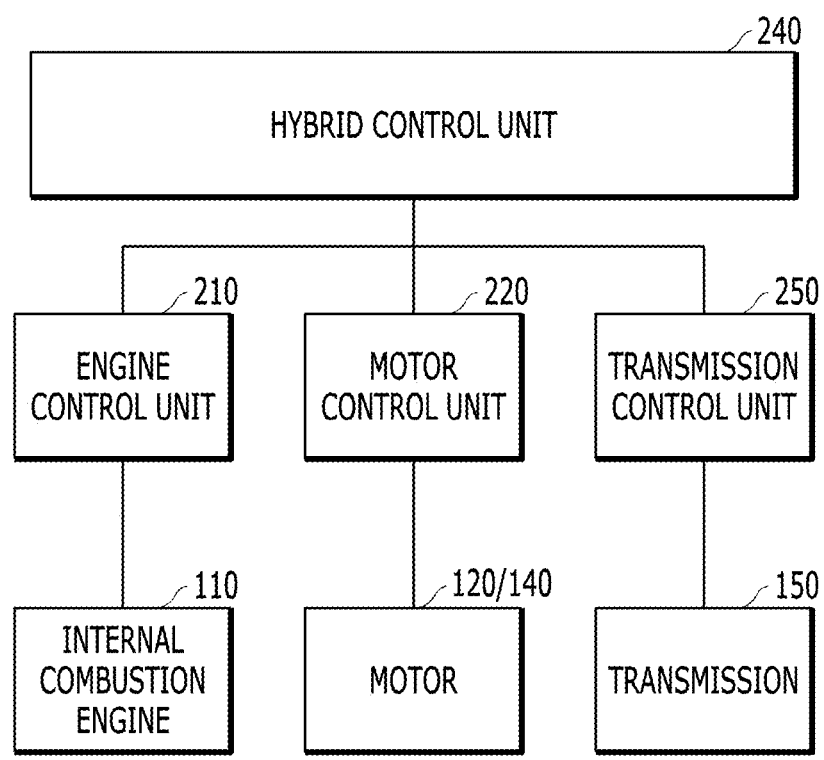
FIG. 2 is a block diagram showing an example of a control system of a hybrid electric vehicle to which embodiments of the present invention are applicable.

FIG. 2 is a block diagram showing an example of the control system of the hybrid electric vehicle to which embodiments of the present invention are applicable.

Referring to FIG. 2, in the hybrid electric vehicle to which embodiments of the present invention are applicable, the internal combustion engine 110 may be controlled by an engine control unit 210, and the starter/generator motor 120 and the drive motor 140 may be controlled by a motor control unit (MCU) 220. Here, the engine control unit 210 is also referred to as an engine management system (EMS).

The transmission 150 is controlled by a transmission control unit (TCU) 250. In some cases, the motor control unit for controlling the starter/generator motor 120 and the motor control unit for controlling the motor 140 may be provided separately from each other.

Each of the control units may be connected to a hybrid control unit (HCU) 240, which is an upper-level control unit that controls the overall process of mode switching, and may provide information necessary for engine clutch control at the time of switching a driving mode or shifting gears and/or information necessary for engine stop control to the hybrid control unit 240, or may perform an operation in response to a control signal under the control of the hybrid control unit 240.

More specifically, the hybrid control unit 240 may determine requested drive power (or requested torque) according to manipulation of a pedal by a driver, and may appropriately distribute the requested drive power to the front wheels 181 and the rear wheels 182 according to the driving state of the vehicle.

In addition, the hybrid control unit 240 may transmit a torque command for controlling the torque of the starter/generator motor 120 to the motor control unit 220 in order to perform control to stop the engine, thereby controlling recovery of the rotational energy of the engine.

Of course, it will be apparent to those skilled in the art that the connection relationships between the control units described above and the functions/division of the control units are merely illustrative, and are not limited by the names thereof. For example, the hybrid control unit 240 may be implemented such that the function thereof is provided by any one of the control units other than the hybrid control unit 240 or such that the function thereof is distributed and provided by two or more of the other control units.

The following description of the embodiments will be made on the assumption that the embodiments are applied to a hybrid electric vehicle having the powertrain configuration shown in FIG. 1 and the control units shown in FIG. 2. However, this is for convenience of description, and it will be apparent to those skilled in the art that the structure of the vehicle according to the embodiment may be changed within a range that remains compatible with the embodiment.

The hybrid electric vehicle to which embodiments of the present invention are applied is configured such that independent drive sources are respectively connected to the front wheels and the rear wheels, and thus is advantageous in that there is no power loss attributable to a transfer case and in that the drive sources are independently controlled, thereby more effectively responding to changes in the amount of tire slip than in the case of a mechanical all-wheel-drive system. In addition, according to a method of controlling driving of the hybrid electric vehicle according to embodiments of the present invention, it is possible to more effectively cope with a rough road through variable control of drive power, a shift pattern, and a shift time.

Figure 3:
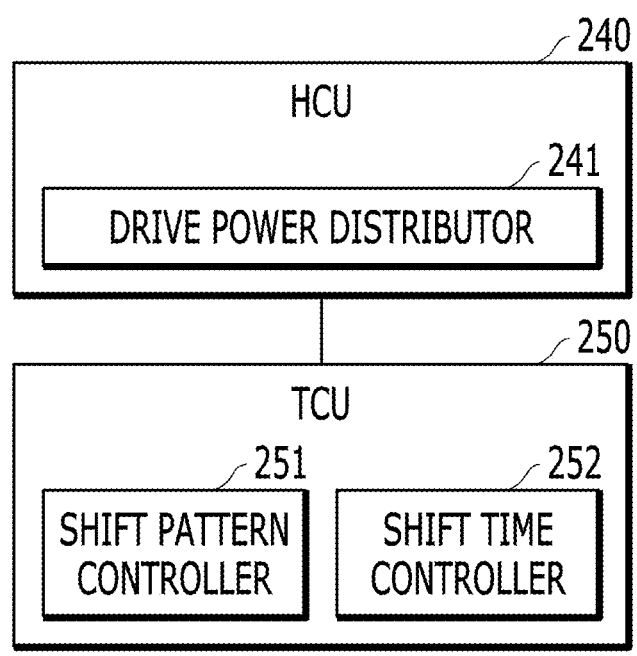
FIG. 3 shows an example of the configurations of the control units according to an embodiment of the present invention.

In order to accomplish the above features, the hybrid control unit 240 and the transmission control unit 250 have the configurations shown in FIG. 3.

FIG. 3 shows an example of the configurations of the control units according to an embodiment of the present invention.

Referring to FIG. 3, the hybrid control unit 240 may include a drive power distributor 241, and the transmission control unit 250 may include a shift pattern controller 251 and a shift time controller 252.

The drive power distributor 241 may compare the amount of tire slip of the front wheels and the amount of tire slip of the rear wheels, which occur according to the road conditions, and may perform control, based on distribution of drive power requested according to the drive mode selected by the driver, such that the magnitude of drive power that is transmitted to the wheels at which the amount of tire slip is relatively large decreases and the magnitude of drive power that is transmitted to the wheels at which the amount of tire slip is relatively small or at which there is no tire slip increases. A detailed description of the control operation of the drive power distributor 241 will be made later with reference to FIGS. 4 and 5.

The shift pattern controller 251 may variably control the shift pattern of the transmission connected to the front wheels to thereby control the drive power that is transmitted to the front wheels. For example, when it is necessary to reduce the magnitude of drive power in consideration of the amount of tire slip of the front wheels according to the road conditions, a shift pattern inducing upshifting is applied in order to reduce the magnitude of drive power that is transmitted to the front wheels. On the other hand, when it is necessary to increase the magnitude of drive power, a shift pattern restricting upshifting is applied in order to prevent reduction in the magnitude of drive power that is transmitted to the front wheels. A detailed description of control of the shift pattern will be made later with reference to FIGS. 6 to 8.

The shift time controller 252 may shorten the shift time by pre-engaging a target gear stage based on the shift pattern determined by the shift pattern controller 251. For example, when it is necessary to induce upshifting according to variable shift-pattern control, the shift time controller 252 performs shift-time shortening control, and when it is necessary to prevent upshifting, the shift time controller 252 may determine whether to perform default control or shift-time shortening control based on the number of revolutions per minute (RPM) of the engine at the beginning of the shift. That is, when the RPM of the engine at the beginning of the shift is relatively low on the basis of the existing (default) shift pattern, default control may be performed, and when the RPM of the engine at the beginning of the shift is relatively high, shift-time shortening control may be performed. Accordingly, it is possible to prevent the occurrence of a problem such as divergence.

Hereinafter, the operation of the constituent parts of the control units shown in FIG. 3 will be described in more detail.

As described above, the drive power distributor 241 may control the drive power according to changes in the amount of tire slip attributable to changes in road conditions, and may control the magnitude of drive power that is transmitted to the front wheels and the rear wheels according to the drive mode. Control of drive power according to changes in road conditions will be described with reference to FIGS. 4A-4D.

FIGS. 4A-4D show examples of distribution of drive power in each situation according to an embodiment of the present invention.

Figure 4A:
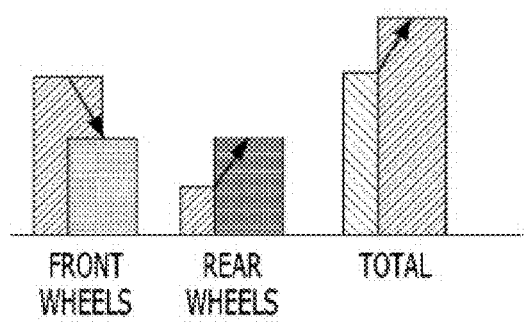
FIGS. 4A-4D show examples of distribution of drive power in each situation according to an embodiment of the present invention.

When the amount of tire slip of the front wheels is greater than the amount of tire slip of the rear wheels, as shown in FIG. 4A, the drive power distributor 241 may increase the total magnitude of drive power while reducing the magnitude of drive power that is transmitted to the front wheels and increasing the magnitude of drive power that is transmitted to the rear wheels.

Figure 4B:
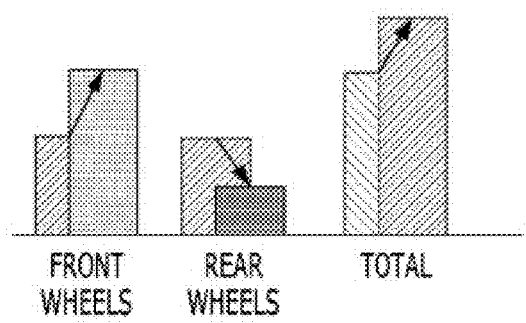

Also, when the amount of tire slip of the rear wheels is greater than the amount of tire slip of the front wheels, as shown in FIG. 4B, the drive power distributor 241 may increase the total magnitude of drive power while increasing the magnitude of drive power that is transmitted to the front wheels and reducing the magnitude of drive power that is transmitted to the rear wheels.

Figure 4C:
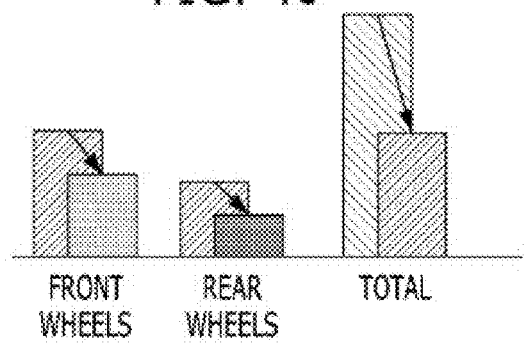
Figure 4D:
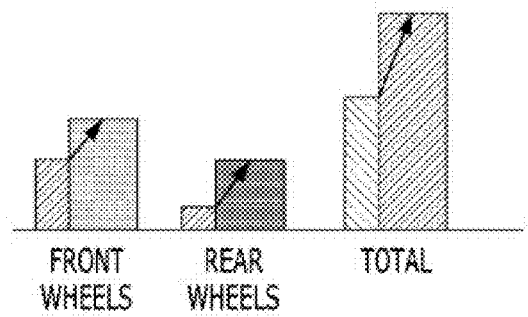

Also, when both the amount of tire slip of the front wheels and the amount of tire slip of the rear wheels increase, as shown in FIG. 4C, the drive power distributor 241 may reduce the total magnitude of drive power by reducing both the magnitude of drive power that is transmitted to the front wheels and the magnitude of drive power that is transmitted to the rear wheels.

Also, when both the amount of tire slip of the front wheels and the amount of tire slip of the rear wheels decrease, as shown in FIG. 4C, the drive power distributor 241 may increase the total magnitude of drive power by increasing both the magnitude of drive power that is transmitted to the front wheels and the magnitude of drive power that is transmitted to the rear wheels.

In the case of a drive mode (e.g. SAND/SNOW) corresponding to terrain in which a reduction in the amount of tire slip is required in order to safely pass therethrough, the drive power distributor 241 may reduce the magnitude of drive power that is transmitted to the front wheels. In the case of a drive mode (e.g. MUD) corresponding to terrain in which road resistance is large, the drive power distributor 241 may increase the magnitude of drive power that is transmitted to the front wheels in order to safely pass therethrough. This will be described with reference to FIGS. 5A and 5B.

Figure 5A:
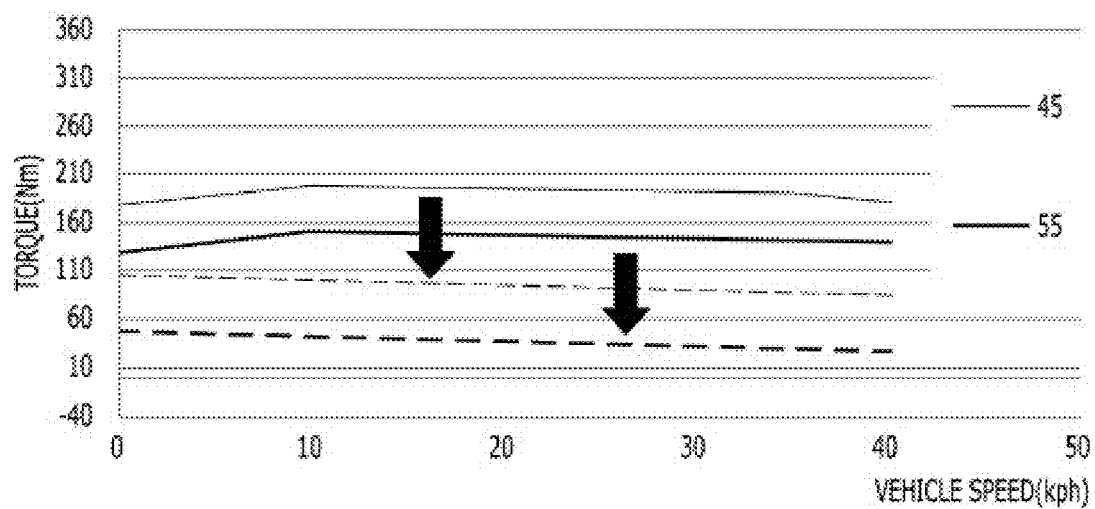
FIGS. 5A and 5B show examples of a process of controlling the magnitude of drive power that is transmitted to front wheels through APS scaling according to a drive mode according to an embodiment of the present invention.
Figure 5B:
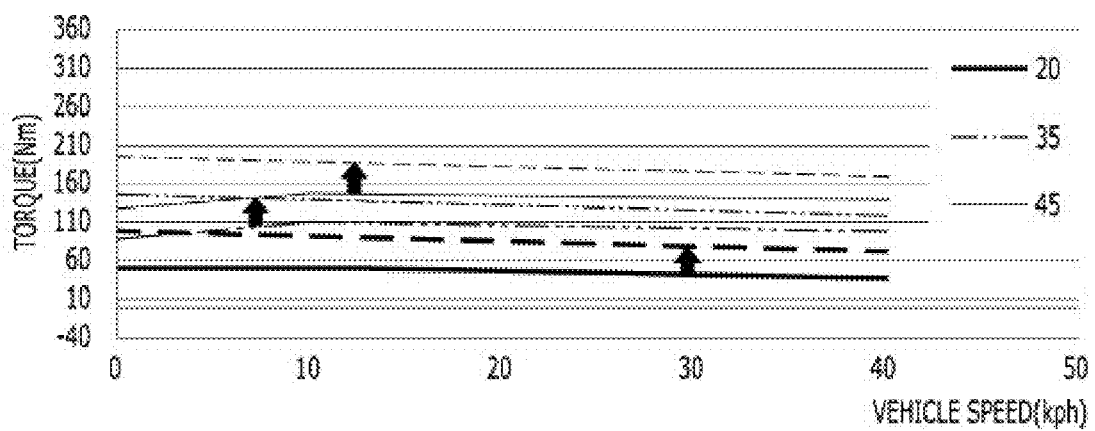

FIGS. 5A and 5B show examples of a process of controlling the magnitude of drive power that is transmitted to the front wheels through APS scaling according to a drive mode according to an embodiment of the present invention.

Each of FIGS. 5A and 5B shows a graph representing input torque of the transmission 150 according to a vehicle speed and an extent of depression of an accelerator pedal (APS, %).

First, in a drive mode, such as SAND/SNOW, corresponding to terrain in which a reduction in the amount of tire slip is required in order to safely pass therethrough, the drive power distributor 241 may apply APS scaling for reducing the magnitude of input torque of the transmission at the same APS, thereby reducing the magnitude of drive power that is transmitted to the front wheels, as shown in FIG. 5A.

Also, in a drive mode, such as MUD, corresponding to terrain in which road resistance is large and thus an increase in the magnitude of drive power is required in order to safely pass therethrough, the drive power distributor 241 may apply APS scaling for increasing the magnitude of input torque of the transmission at the same APS, thereby increasing the magnitude of drive power that is transmitted to the front wheels, as shown in FIG. 5B.

Meanwhile, in relation to drive power that is transmitted to the rear wheels, the drive power distributor 241 may control the magnitude of drive power that is transmitted to the rear wheels based on the temperature of the motor and the battery discharge limit. For example, the drive power distributor 241 may limit the drive power when the temperature of the motor is equal to or higher than a predetermined temperature, and may calculate the maximum possible magnitude of drive power based on the amount of battery discharge limit. Accordingly, when the maximum possible magnitude of drive power, calculated based on the temperature of the motor and the battery discharge limit, is greater than the magnitude of drive power requested for the rear wheels, the drive power distributor 241 may perform control such that requested drive power is output, and when the maximum possible magnitude of drive power is equal to or less than the magnitude of requested drive power, the drive power distributor 241 may perform control such that the maximum drive power is output.

Next, a shift pattern in which the shift pattern controller 251 performs variable control will be described with reference to FIGS. 6 to 8.

Figure 6:
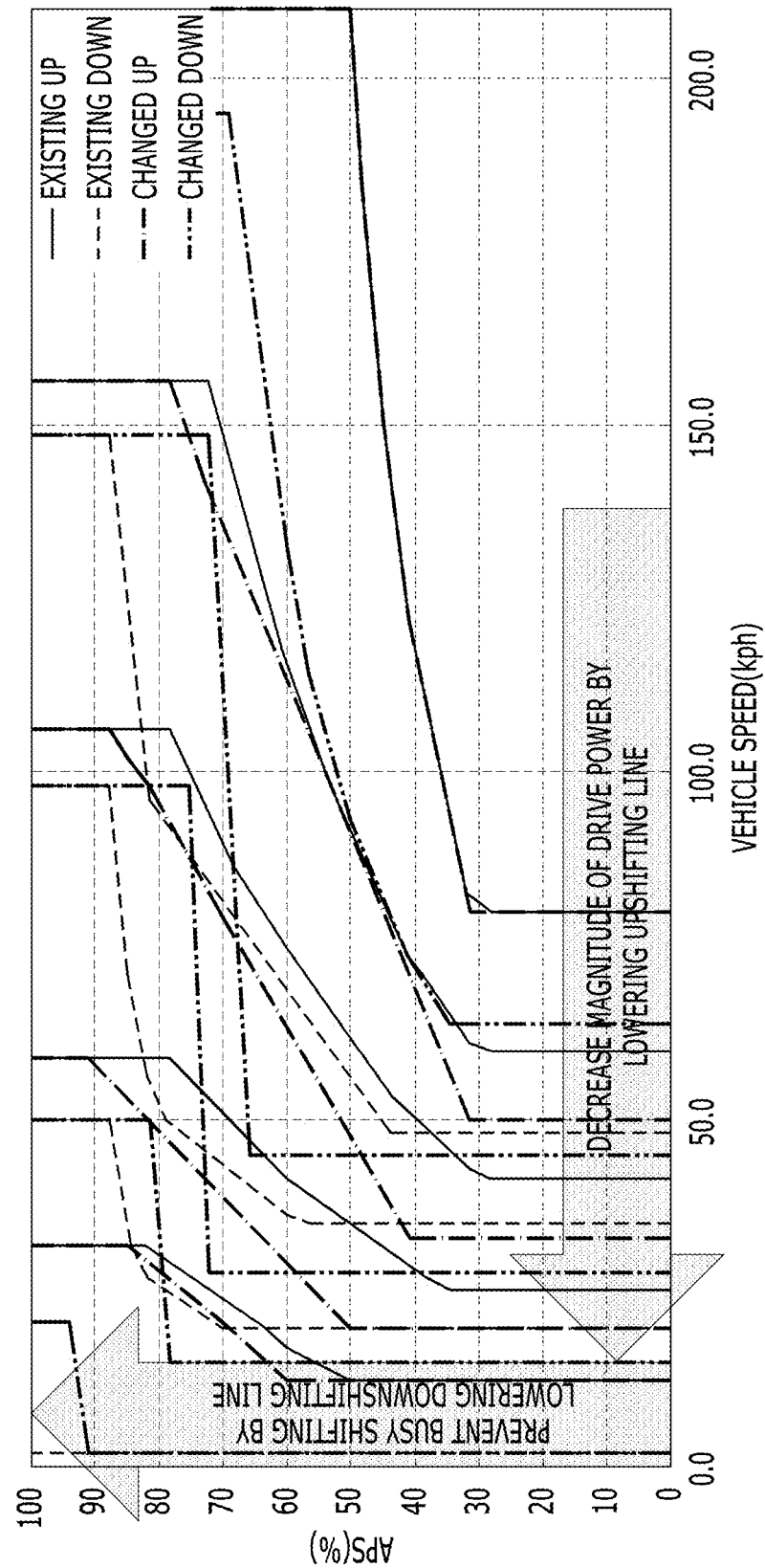
FIG. 6 shows an example of variable shift-pattern control performed when the amount of tire slip of the front wheels increases according to an embodiment of the present invention.

FIG. 6 shows an example of variable shift-pattern control performed when the amount of tire slip of the front wheels increases according to an embodiment of the present invention.

When the amount of tire slip of the front wheels increases, it is required to reduce the magnitude of drive power that is transmitted to the front wheels in order to reduce the amount of tire slip. To this end, as shown in FIG. 6, the shift pattern controller 251 may induce upshifting by lowering the upshifting line (from "EXISTING UP" to "CHANGED UP") of the existing (i.e. default) shift pattern. In this case, the shift pattern controller 251 may also lower the downshifting line (from "EXISTING DOWN" to "CHANGED DOWN"), thereby making it difficult to shift down after upshifting, thus preventing busy shifting.

Figure 7:
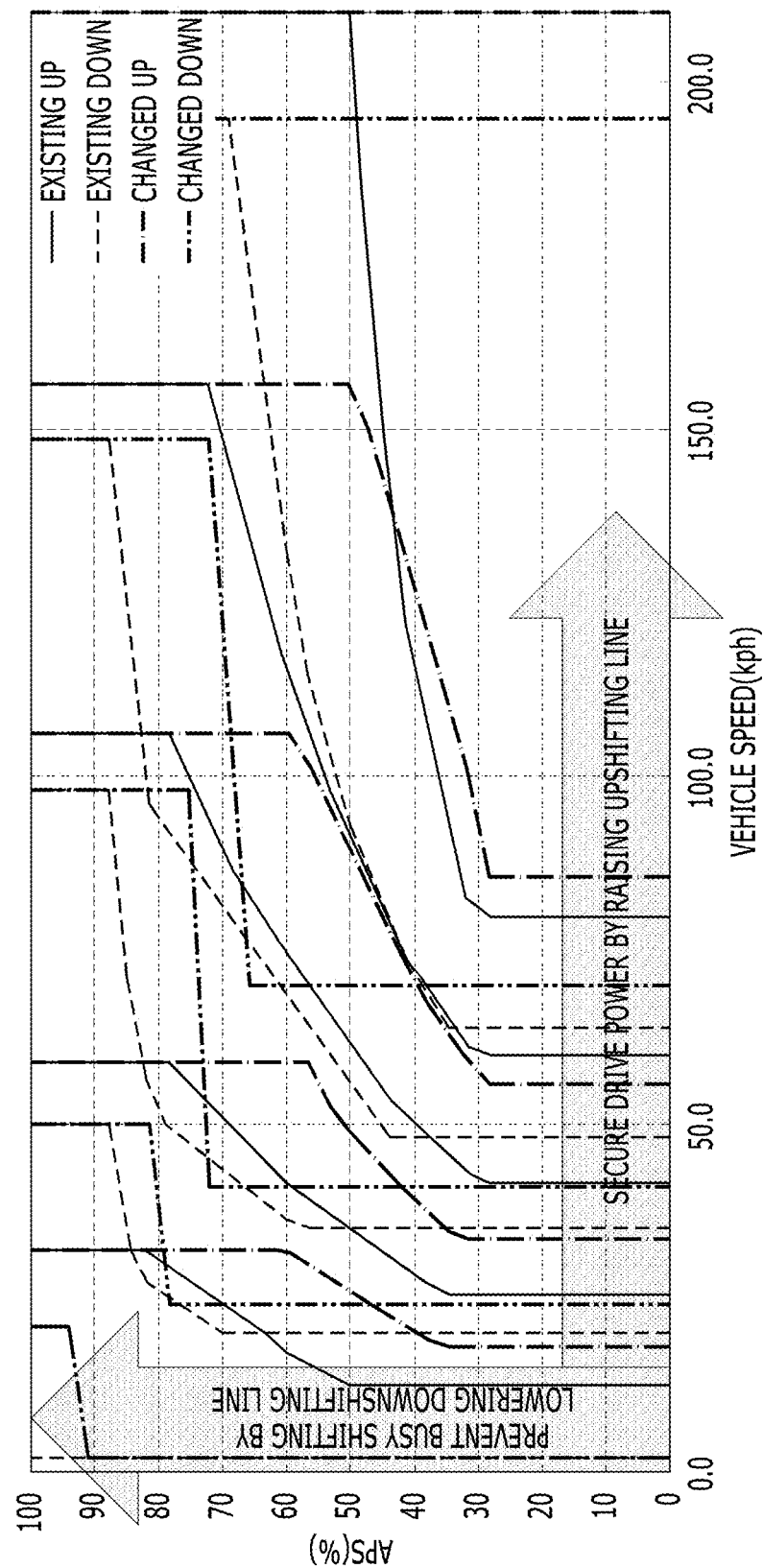
FIG. 7 shows an example of variable shift-pattern control performed when the amount of tire slip of the front wheels decreases according to an embodiment of the present invention.

FIG. 7 shows an example of variable shift-pattern control performed when the amount of tire slip of the front wheels decreases according to an embodiment of the present invention.

When the amount of tire slip of the front wheels decreases, it is required to increase the magnitude of drive power that is transmitted to the front wheels in order to cope with a rough road. To this end, as shown in FIG. 7, the shift pattern controller 251 may restrict upshifting by raising the upshifting line (from "EXISTING UP" to "CHANGED UP") of the existing shift pattern.

Figure 8:
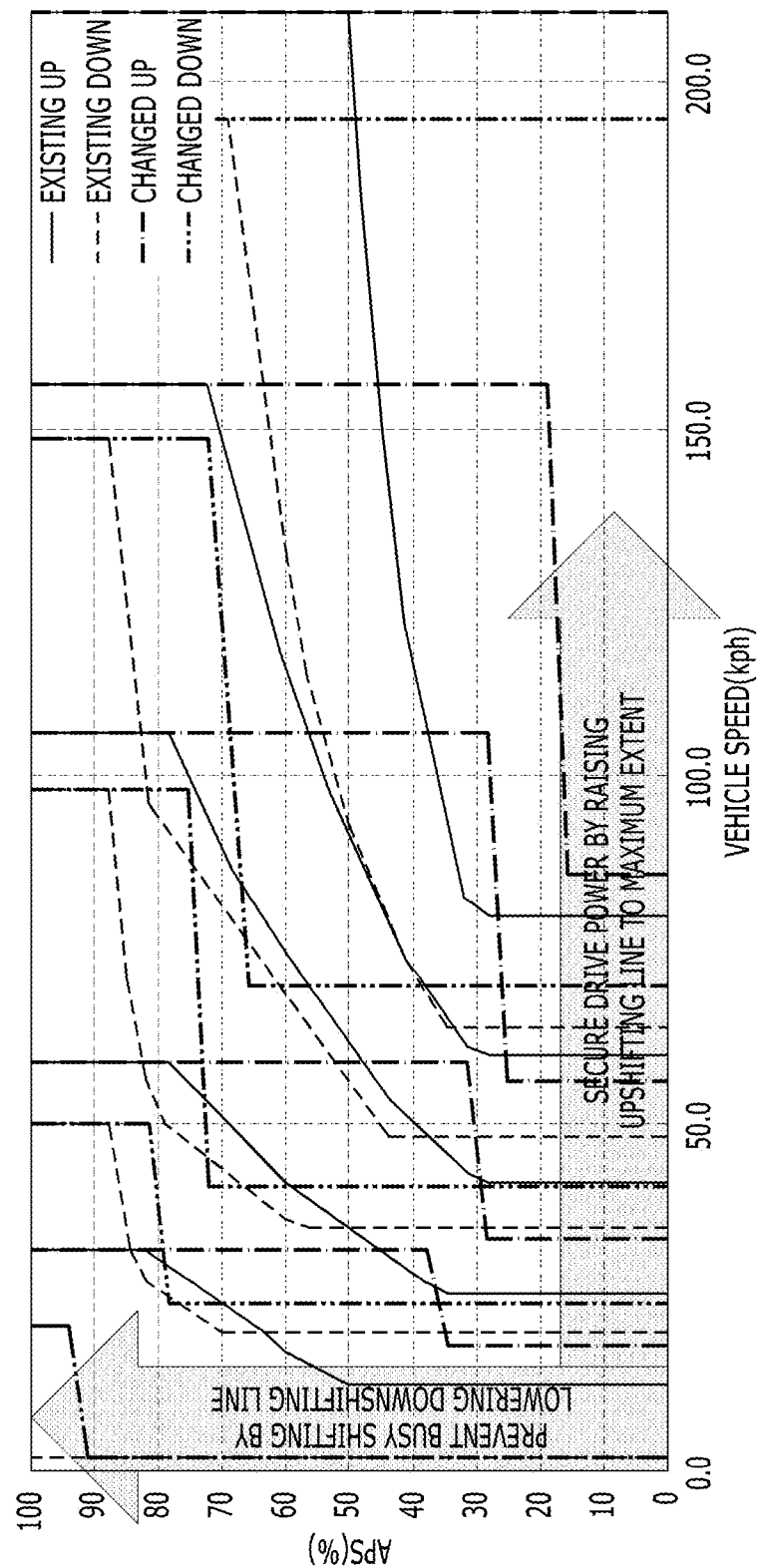
FIG. 8 shows an example of variable shift-pattern control performed when the total magnitude of drive power that is transmitted to the front and rear wheels increases according to an embodiment of the present invention.

FIG. 8 shows an example of variable shift-pattern control performed when the total magnitude of drive power that is transmitted to the front and rear wheels increases according to an embodiment of the present invention.

As shown in FIG. 8, when it is necessary to increase both the magnitude of drive power that is transmitted to the front wheels and the magnitude of drive power that is transmitted to the rear wheels, the shift pattern controller 251 may change the upshifting line ("EXISTING UP") of the existing shift pattern to the maximum line ("CHANGED UP"), thereby enabling quick response to a rough road.

Meanwhile, busy shifting may occur according to changes in the amount of tire slip. In order to prevent this, the shift pattern controller 251 may additionally perform variable shift-pattern control only when the amount of tire slip is increased or decreased by a predetermined level or more by variable shift-pattern control.

The driving control operation according to the embodiment described above will be described with reference to FIG. 9.

Figure 9:
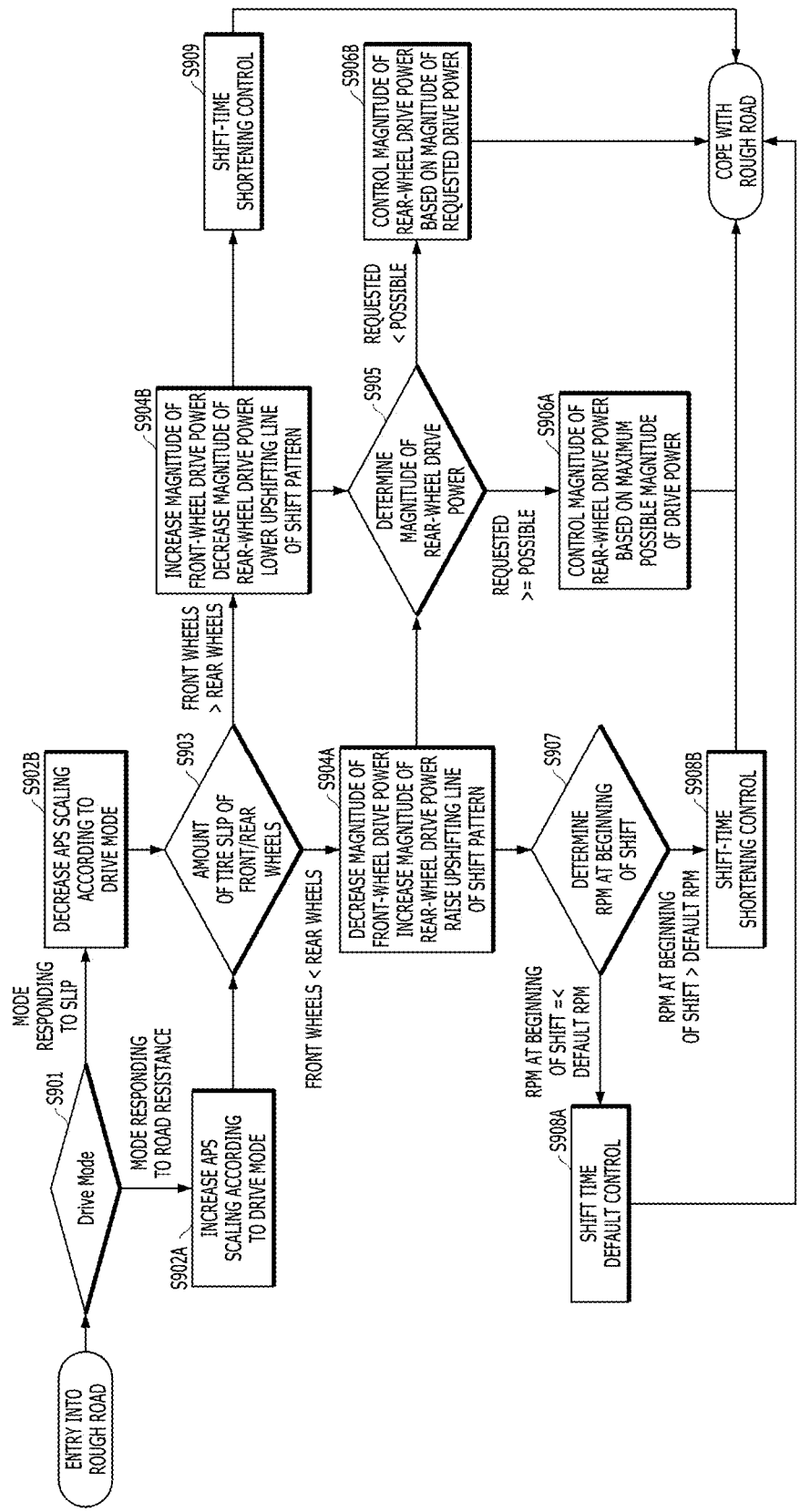
FIG. 9 is a flowchart showing an example of a shift control process of an all-wheel-drive hybrid electric vehicle according to an embodiment of the present invention.

FIG. 9 is a flowchart showing an example of the shift control process of the all-wheel-drive hybrid electric vehicle according to an embodiment of the present invention.

Referring to FIG. 9, the drive mode may be set to any one of a plurality of terrain drive modes according to entry into a rough road (S901). If the set drive mode is a mode (e.g. MUD) corresponding to terrain in which road resistance is large, the hybrid control unit 240 may increase the magnitude of drive power that is transmitted to the front wheels by increasing APS scaling (S902A) as described above with reference to FIG. 5B.

On the other hand, when the set drive mode is a mode (e.g. SAND/SNOW) corresponding to terrain in which a reduction in the amount of tire slip is required, the hybrid control unit 240 may reduce the magnitude of drive power that is transmitted to the front wheels by decreasing APS scaling (S902B) as described above with reference to FIG. 5A.

In addition, the hybrid control unit 240 may compare the amount of tire slip of the front wheels with the amount of tire slip of the rear wheels (S903). When the amount of tire slip of the rear wheels is greater than the amount of tire slip of the front wheels, the hybrid control unit 240 may distribute drive power such that the magnitude of drive power that is transmitted to the front wheels is decreased and such that the magnitude of drive power that is transmitted to the rear wheels is increased, and the transmission control unit 250 may perform variable control such that the upshifting line of the shift pattern is raised (S904A).

On the other hand, when the amount of tire slip of the front wheels is greater than the amount of tire slip of the rear wheels, the hybrid control unit 240 may distribute the drive power such that the magnitude of drive power that is transmitted to the front wheels is increased and such that the magnitude of drive power that is transmitted to the rear wheels is decreased, and the transmission control unit 250 may perform variable control such that the upshifting line of the shift pattern is lowered (S904B).

If the amount of tire slip of the rear wheels and the amount of tire slip of the front wheels are equal to each other, the process may directly proceed to step S905.

When drive power is transmitted to the rear wheels, the hybrid control unit 240 may determine the maximum possible magnitude of drive power for the rear wheels in consideration of the temperature of the motor and the battery discharge limit (S905). If the magnitude of drive power requested for the rear wheels is equal to or greater than the maximum possible magnitude of drive power, the hybrid control unit 240 may control the drive power for the rear wheels based on the maximum possible magnitude of drive power (S906A). On the other hand, if the maximum possible magnitude of drive power is greater than the magnitude of drive power requested for the rear wheels, the hybrid control unit 240 may control the drive power for the rear wheels based on the requested drive power (S906B).

When the upshifting line of the shift pattern is controlled to be raised (S904A) in response to the comparison between the amount of tire slip of the front wheels and the amount of tire slip of the rear wheels (S903), the transmission control unit 250 may determine the RPM of the engine at the beginning of the shift (S907). If the RPM of the engine at the beginning of the shift is equal to or less than a default RPM, the transmission control unit 250 may apply default control to the shift time (S908A), and if the RPM of the engine at the beginning of the shift is greater than the default RPM, the transmission control unit 250 may perform shift-time shortening control (S908B).

On the other hand, when the upshifting line of the shift pattern is controlled to be lowered (S904B) in response to the comparison between the amount of tire slip of the front wheels and the amount of tire slip of the rear wheels (S903), the transmission control unit 250 may perform shift-time shortening control irrespective of the RPM of the engine at the beginning of the shift (S99).

Embodiments of the present invention may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), Read-Only Memory (ROM), Random Access Memory (RAM), Compact Disk ROM (CD-ROM), a magnetic tape, a floppy disc, and an optical data storage.

As is apparent from the above description, according to an all-wheel-drive hybrid electric vehicle associated with at least one embodiment of the present invention configured as described above, it is possible to more effectively control driving thereof.

Particularly, it is possible to effectively cope with a rough road through variable control of drive power, a shift pattern, and a shift time.

However, the effects achievable through embodiments of the present invention are not limited to the above-mentioned effects, and other effects not mentioned herein will be clearly understood by those skilled in the art from the above description.

It will be apparent to those skilled in the art that various changes in form and details may be made without departing from the spirit and essential characteristics of the invention set forth herein. Accordingly, the above detailed description is not intended to be construed to limit the invention in all aspects and to be considered by way of example. The scope of the invention should be determined by reasonable interpretation of the appended claims and all equivalent modifications made without departing from the invention should be included in the following claims.

What is claimed is:

1. A method of controlling driving of a hybrid electric vehicle in which an engine is connected to main drive wheels via a transmission and a motor is connected to auxiliary drive wheels, the method comprising:
   setting a drive mode;
   controlling an input torque of the transmission in response to an extent of depression of an accelerator pedal (APS) according to the drive mode;
   performing distribution of drive power to the main drive wheels from the engine and to the auxiliary drive wheels from the motor and variable shift-pattern control for the transmission based on a result of a comparison between an amount of slip of the main drive wheels and an amount of slip of the auxiliary drive wheels; and
   determining whether to perform variable shift-time control for the transmission in consideration of at least a type of the variable shift-pattern control or a number of revolutions per minute (RPM) of the engine at beginning of shifting of the transmission.

2. The method according to claim 1, wherein controlling the input torque comprises:
   increasing an APS scaling based on the drive mode being a mode corresponding to terrain in which road resistance is larger than a predetermined resistance; and
   decreasing the APS scaling based on the drive mode being a mode corresponding to the terrain in which a reduction in the amount of slip is required.

3. The method according to claim 2, wherein:
   the mode corresponding to the terrain in which the road resistance is larger than the predetermined resistance includes a MUD mode; and
   the mode corresponding to the terrain in which the reduction in the amount of slip is required includes a SAND mode and a SNOW mode.

4. The method according to claim 2, wherein, in response to the amount of slip of the auxiliary drive wheels being greater than the amount of slip of the main drive wheels, performing the distribution of the drive power and the variable shift-pattern control comprises:
   decreasing a magnitude of the drive power that is transmitted to the main drive wheels;
   increasing the magnitude of the drive power that is transmitted to the auxiliary drive wheels; and
   raising an upshifting line of a shift pattern.

5. The method according to claim 4, wherein determining whether to perform the variable shift-time control comprises performing shift-time shortening control in response to the RPM of the engine at the beginning of shifting is greater than a default RPM.

6. The method according to claim 5, wherein performing the shift-time shortening control comprises pre-engaging a target gear stage.

7. The method according to claim 4, wherein determining whether to perform the variable shift-time control comprises performing default shift control in response to the RPM of the engine at the beginning of shifting is equal to or less than a default RPM.

8. The method according to claim 2, wherein, in response to the amount of slip of the main drive wheels being greater than the amount of slip of the auxiliary drive wheels, performing the distribution of the drive power and the variable shift-pattern control comprises:
   increasing a magnitude of the drive power that is transmitted to the main drive wheels;
   decreasing the magnitude of the drive power that is transmitted to the auxiliary drive wheels; and
   lowering an upshifting line of a shift pattern.

9. The method according to claim 8, wherein determining whether to perform the variable shift-time control comprises performing shift-time shortening control irrespective of the RPM of the engine at the beginning of shifting.

10. A non-transitory computer-readable recording medium storing a program configured to execute the method of controlling driving of the hybrid electric vehicle according to claim 1.

11. A hybrid electric vehicle comprising:
    an engine connected to main drive wheels via a transmission;
    a motor connected to auxiliary drive wheels;
    a first controller configured to perform distribution of drive power to the main drive wheels from the engine and to the auxiliary drive wheels from the motor according to a drive mode, wherein the first controller comprises a drive power distributor configured to control an input torque of the transmission in response to an extent of depression of an accelerator pedal (APS) according to the drive mode and to perform the distribution of the drive power to the main drive wheels and the auxiliary drive wheels based on a result of a comparison between an amount of slip of the main drive wheels and the amount of slip of the auxiliary drive wheels; and a second controller configured to control the transmission, wherein the second controller comprises:

a shift pattern controller configured to perform variable shift-pattern control for the transmission in response to the distribution of the drive power by the drive power distributor; and a shift time controller configured to determine whether to perform variable shift-time control for the transmission in consideration of at least a type of the variable shift-pattern control or a number of revolutions per minute (RPM) of the engine at beginning of shifting of the transmission.

12. The hybrid electric vehicle according to claim 11, wherein the drive power distributor is configured to increase an APS scaling based on the drive mode being a mode corresponding to terrain in which road resistance is larger than a predetermined resistance, and to decrease the APS scaling based on the drive mode being a mode corresponding to the terrain in which a reduction in the amount of slip is required.

13. The hybrid electric vehicle according to claim 12, wherein:

the mode corresponding to the terrain in which the road resistance is larger than the predetermined resistance includes a MUD mode; and the mode corresponding to the terrain in which the reduction in the amount of slip is required includes a SAND mode and a SNOW mode.

14. The hybrid electric vehicle according to claim 12, wherein, in response to the amount of slip of the auxiliary drive wheels being greater than the amount of slip of the main drive wheels, the drive power distributor is configured to decrease a magnitude of the drive power that is transmitted to the main drive wheels and to increases the magnitude of the drive power that is transmitted to the auxiliary drive wheels, and the shift pattern controller is configured to raise an upshifting line of a shift pattern.

15. The hybrid electric vehicle according to claim 14, wherein, in response to the RPM of the engine at the beginning of shifting being greater than a default RPM, the shift time controller is configured to perform shift-time shortening control.

16. The hybrid electric vehicle according to claim 15, wherein the shift time controller is configured to perform the shift-time shortening control so as to pre-engage a target gear stage.

17. The hybrid electric vehicle according to claim 14, wherein, in response to the RPM of the engine at the beginning of shifting being equal to or less than a default RPM, the shift time controller is configured to perform control such that default shift control is performed.

18. The hybrid electric vehicle according to claim 12, wherein, in response to the amount of slip of the main drive wheels being greater than the amount of slip of the auxiliary drive wheels, the drive power distributor is configured to increase a magnitude of the drive power that is transmitted to the main drive wheels and to decrease the magnitude of the drive power that is transmitted to the auxiliary drive wheels, and the shift pattern controller is configured to lower an upshifting line of a shift pattern.

19. The hybrid electric vehicle according to claim 18, wherein the shift time controller is configured to perform control such that shift-time shortening control is performed irrespective of the RPM of the engine at the beginning of shifting.

* * * * *